United States Patent [19]

Le Marchand et al.

[11] Patent Number: 4,635,760

[45] Date of Patent: Jan. 13, 1987

[54] DISK BRAKE WITH AUTOMATIC ADJUSTMENT

[75] Inventors: Claude Le Marchand, Domont; Jean-Louis Gerard, Paris, both of France

[73] Assignee: Bendix France, Paris, France

[21] Appl. No.: 763,727

[22] Filed: Aug. 8, 1985

[30] Foreign Application Priority Data

Sep. 5, 1984 [FR] France ............................. 84 13658
Oct. 31, 1984 [FR] France ............................. 84 16643

[51] Int. Cl.$^4$ .................................................. F16D 65/56
[52] U.S. Cl. .................................. 188/71.9; 188/196 D
[58] Field of Search ............. 188/79.5 GE, 71.8, 71.9, 188/106 P, 196 D, 196 BA

[56] References Cited

U.S. PATENT DOCUMENTS

| 3,991,859 | 11/1976 | Coulter et al. | 188/71.9 |
| 4,246,985 | 1/1981 | Shimizu et al. | 188/71.9 |
| 4,399,894 | 8/1983 | Tribe | 188/71.9 |

FOREIGN PATENT DOCUMENTS

| 1480270 | 10/1969 | Fed. Rep. of Germany . |
| 1750056 | 12/1970 | Fed. Rep. of Germany . |
| 1487560 | 7/1967 | France . |
| 2277275 | 1/1976 | France . |
| 2326624 | 4/1977 | France . |
| 2402806 | 4/1979 | France . |

| 1381282 | 1/1975 | United Kingdom . |

*Primary Examiner*—Duane A. Reger
*Attorney, Agent, or Firm*—Larry J. Palguta; Ken C. Decker

[57] ABSTRACT

The subject of the invention is a disk brake with automatic adjustment of the type incorporating a sliding calliper (10), a brake actuator (12) acting directly upon a first friction component (14) and, by reaction through the calliper (10), upon a second friction component (16), the brake actuator (12) incorporating a mechanical control (32) acting upon a hydraulic control piston (20) through an automatic adjustment device. The automatic adjustment device consists of a screw and nut system (46-60) of reversible pitch which is capable of being actuated by the hydraulic piston (20) beyond a predetermined travel of the latter, the adjustment device incorporating an annular component (76), firmly fixed in rotation to the nut and co-operating with a control piston (64), immobilizing the annular component (76) in rotation when the hydraulic pressure acting upon the hydraulic control piston (20) reaches a predetermined value. According to the invention, the hydraulic piston (20) and the control piston (64) are coaxially mounted one inside the other, and co-operate in sealed reversible sliding thus allowing the hydraulic piston (20) to be dismantled as a unit from the control piston (64), from the annular component (76) and from the nut (60).

12 Claims, 3 Drawing Figures

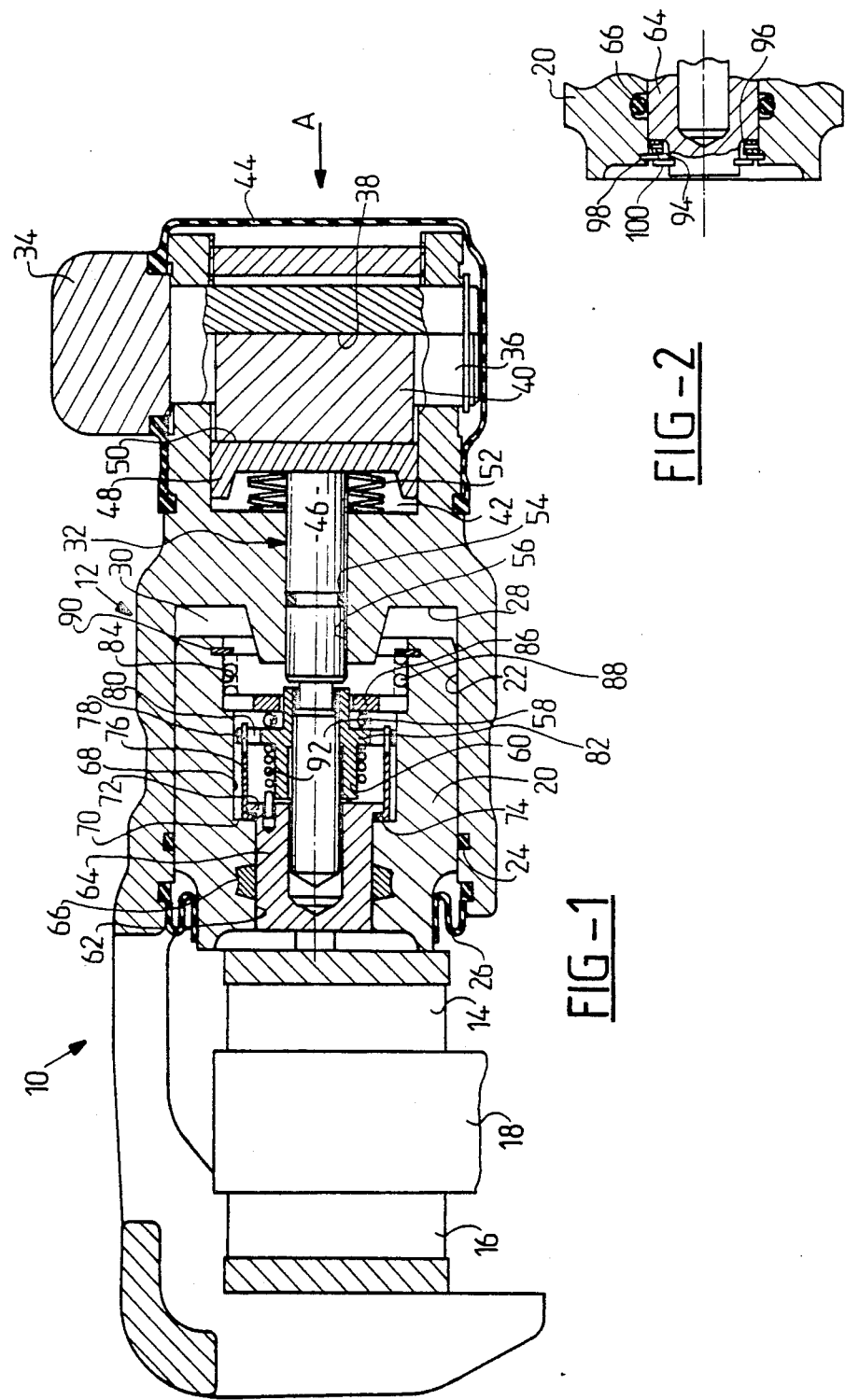

DISK BRAKE WITH AUTOMATIC ADJUSTMENT

The invention concerns a disk brake with automatic adjustment for a motor vehicle.

The invention more particularly concerns a disk brake of the type with sliding calliper incorporating a brake actuator which is capable of being operated independently either by fluid pressure or by a mechanical control. Operation of the brake actuator pushes directly a first friction component into frictional engagement with a first surface of a rotating disk and, by reaction through the sliding calliper, a second friction component into frictional engagement with a second surface of the disk, opposite the first surface. The calliper slides relative to a fixed support which carries directly or indirectly the torque generated by the friction components. In brakes of this type, taking into consideration the initial thickness of the friction components, it is necessary to have an automatic adjustment device located on the mechanical control in such a way that the travel of this control does not alter as a function of the wear of the friction components. Numerous solutions have been proposed to resolve this problem. However, these systems generally have the disadvantage of providing an adjustment irrespective of the cause of operation of this automatic adjustment. This type of device comes into operation not only to compensate for wear of the friction components, which is normal, but also to compensate for the elastic distortion of the calliper for high hydraulic control pressures. This type of device requires to have a dead travel which does not cause the automatic adjustment to intervene, the dead travel being relatively large and of the order of the distortion observed on the calliper during its operation.

In order to resolve this problem, the Applicant Company proposed in French Patent Application No. 82-21,683 filed under the number 2,538,486 a disk brake of this type in which the automatic adjustment is neutralized when the control pressure reaches a predetermined value by means of a control piston which prevents rotation of the nut through a bush which is firmly fixed in rotation to the nut, the control piston being annular and situated between the body of the brake actuator and a cylindrical portion of the screw.

This solution gives results which are perfectly satisfactory, with the disadvantage, however, that the brake must be designed initially to accept this device, and that the value of the predetermined pressure, being defined by the bore, of the body of the brake actuator provided to house the annular control piston, can no longer be modified after machining.

The aim of the invention is to propose a disk brake of the type described above in which these disadvantages are eliminated while possessing the advantages of the latter. For this purpose the invention proposes a disk brake with automatic adjustment of the type incorporating a sliding calliper, a brake actuator acting directly upon a first friction component and, by reaction through the calliper, upon a second friction component, the brake actuator incorporating a mechanical control acting upon a hydraulic control piston through an automatic adjustment device, the adjustment device consisting of a screw and nut system with reversible pitch capable of being operated by the hydraulic piston beyond a predetermined travel of the latter, the adjustment device incorporating a bush firmly fixed in rotation to the nut and cooperating with a control piston immobilizing the bush in rotation and in translation when the hydraulic pressure acting upon the hydraulic control piston reaches a predetermined value, characterized in that the hydraulic piston and the said control piston are mounted coaxially one inside the other and co-operate in sealed reversible sliding.

It is understood that owing to such a construction, the control piston being housed in the hydraulic piston, or vice versa, the brake actuator and more particularly the body is not modified to accept the control piston and consequently it is easy to modify the value of the predetermined pressure by replacement of the hydraulic piston. It is understood that owing to this construction brakes incorporating a conventional automatic adjustment with a screw and nut system of reversible pitch can accept the hydraulic piston incorporating a control piston without any modification of the brake, which allows existing brakes to benefit from a device avoiding over-adjustment and introducing a considerable reduction of dead travel.

Other characteristics and advantages of the disk brake, the subject of the present invention, will emerge on reading the description of the brake, with reference to the accompanying drawings in which:

FIG. 1 is a view in section of a brake calliper constructed in accordance with the teachings of the present invention;

FIG. 2 is a partial view in section of a variant of that shown in FIG. 1; and

Figure 3:
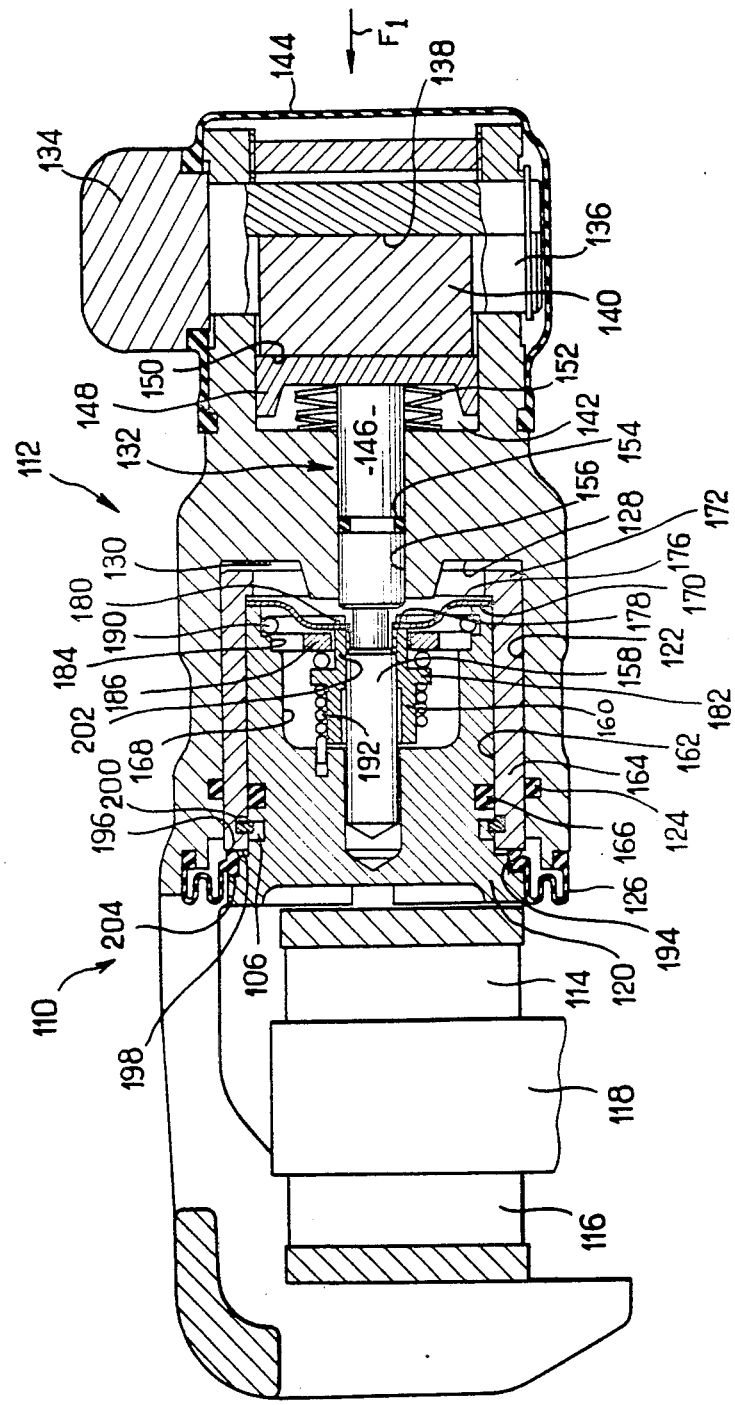
FIG. 3 is a view similar to that shown in FIG. 1 for a second embodiment.

The disk brake shown in FIG. 1 incorporates a sliding calliper given as a unit the general reference 10 mounted on a fixed support or component (not shown) capable of being fixed to a fixed portion of the vehicle (not shown). The calliper 10 incorporates a brake actuator given as a unit the general reference 12 capable of acting directly upon a first friction component 14 and indirectly, through the sliding calliper, upon a second friction component 16 so as to push both the latter into frictional engagement with a rotating disk 18. The brake actuator 12 incorporates a hydraulic control and a mechanical control as will be seen in greater detail. In a conventional manner, the hydraulic control is provided by a hydraulic control piston 20 mounted so as to slide in a bore 22 formed in the brake actuator 12. The seal between the piston 20 and the bore 22 is provided by a seal 24, the piston also being protected by a piston cap 26. The piston 20 and a wall 28 of the bottom of the bore 22 define a chamber 30 which is capable of being connected to a source of pressure (not shown) such as, for example, the master cylinder of the vehicle.

The mechanical control, given as a unit the general reference 32, is provided by means of a lever 34 capable of being joined to a cable or similar (not shown) firmly fixed to a shaft 36 in which a groove 38 is formed which houses a link 40. The shaft 36 is housed in two bores formed in the brake actuator and is immobilized longitudinally relative to the actuator by means of a shoulder formed on the lever 34 on each side by means of a circlip or similar device. The shaft 36 and link 40 are housed in a blind bore 42 formed in the brake actuator, the open portion of the bore is provided with a plug and the assembly is protected by a flexible cap 44. The bore 42 also houses a screw 46 of which an enlarged portion 48 incorporates a groove 50 which co-operates with the link 40. A return spring 52 is situated between the bottom of the blind bore 42 and the enlarged portion 48.

The screw 46 incorporates a cylindrical portion in which a groove is formed which incorporates a seal 54. This seal 54 and the cylindrical portion of the screw 46 are capable of sliding relative to a bore 56 formed in the body of the brake actuator. The screw 46 extends into the chamber 30 by a threaded portion 58 of reversible pitch on which a nut 60 is mounted. The hydraulic control piston 20 incorporates a bore 62 in which a control piston 64 is mounted, being housed so as to slide and to be sealed in this bore 62 by means of a seal 66. The hydraulic piston 20 incorporates a second bore 68 of a diameter greater than the diameter of the bore 62, the step from one diameter to the other forming a wall 70 facing the chamber 30. A collar 74 is positioned between this wall 70 and a collar 72 formed on the end of the control piston 64, the collar 74 being formed on an annular component 76 forming a bush which is coaxial with the control piston 64. The end of the bush 76 on the same side as the chamber 30 forms a number of fingers 78 which penetrate into grooves 80 formed on a collar 82 carried by the nut 60. Co-operation of these fingers 78 with these grooves 80 firmly fixes the bush 76 and the nut 60 in rotation while allowing relative axial movement between these two components. A third bore 84 of a diameter greater than the bore 68 houses an annular component 86 so as to slide, which is held so as to bear against the step formed by the two bores 68 and 84 by means of a spring 88 which bears against a circlip or similar component 90 which is firmly fixed to the piston 20 close to the chamber 30. A ball thrust race is positioned between the annular component 86 and the collar 82, the annular component 86 and the collar 82 forming rolling tracks. A unidirectional clutch 92 is positioned between the control piston 64 and the nut 60, the unidirectional clutch 92 being formed in the embodiment shown by a spring clutch mounted on a cylindrical portion of the nut 60, one end of which enters a hole formed in the control piston 64.

The brake described above with the aid of FIG. 1 operates in the following manner:

At rest, the different components of the brake occupy the positions shown. When the brake is operated by means of the mechanical control, the lever 34 and the shaft 36 push the link 40 in a general direction shown by the arrow A. The link 40, through the groove 50, pushes the enlarged portion 48 of the screw 46 against the spring 52. As the cylindrical portion of the screw can slide relative to the bore 56 formed in the brake actuator, the screw 46 also moves in the direction of the arrow A. This movement of the screw 46 is transmitted to the nut 60 by means of the threaded portion 58, rotation of the nut 60 being prevented by the unidirectional clutch 92, and the nut 60 comes to bear against the control piston 64 which, by means of the collar 72 through the collar 74 of the bush 76, pushes the hydraulic piston 20 through the wall 70. The force of the link 40 is thus transmitted to the friction component 14 and, by the reaction of this friction component 14 against the disk 18, an opposite reaction appears on the shaft 36 which drives the calliper 10 in sliding in the direction opposite to that shown by the arrow A, which brings the friction component 16 in contact with the disk 18. Upon release of the manual control the different components of the brake recover the positions shown.

When the brake is operated by means of the hydraulic control, a hydraulic pressure is applied to the chamber 30 so as to push the piston 20 to the left, referring to FIG. 1. If the movement of the piston 20 relative to the nut 60 does not exceed the operational play defined between the ball thrust race, the annular component 86 and the collar 82, the movement of the piston 20 has no effect on the automatic adjustment. If the movement of the piston 20 is greater than the predetermined operational play, the nut 60 is driven to the left by the piston 20 through the ball thrust race, the annular component 86 and the spring 88, itself driven by the circlip 90 which is firmly fixed to the piston. The screw 46 being immobilized axially by means of the spring 52, the nut 60, owing to the reversible pitch, turns relative to the screw 46 so as to be able to follow the movement of the piston 20, the unidirectional clutch 92 allowing this rotation. During this phase of operation, the bush 76 is free to turn with the nut 60, and the control piston 64 does not apply the collar 74 of the bush 76 to the wall 70 as will be seen below. If the hydraulic pressure is then released, the seal 24 in a conventional manner causes the piston 20 to retract slightly, the unidirectional clutch 92 preventing rotation of the nut 60. As during the application of braking the nut has turned, moving to the left, the automatic adjustment device is now in a new position which is offset to the left and prevents the piston from occupying its initial position.

If, however, braking is not released immediately, the pressure in the chamber 30 continues to rise and under the effect of this pressure and of the force generated by the piston 20 the calliper distorts. It is thus necessary to prevent the operation of the adjustment before mechanical distortion of the calliper commences.

When the pressure in the chamber 30 reaches the level defined by the cross-sectional area of the control piston 64 and of the resistance to movement of this piston generated by the seal 66, the control piston 64 moves to the left under the effect of this pressure and traps the collar 74 of the bush 76, by means of the collar 72, against the wall 70 of the piston 20. The bush 76 then being immobilized in rotation and axially by the control piston 64, any rotation of the nut 60 becomes impossible owing to the fingers 78 and the grooves 80. The nut 60 compresses the spring 88 through the intermediary of the ball thrust race and of the annular component 86. The piston 20 moves to the left under the effect of the pressure prevailing in the chamber 30 generating distortion in the calliper owing to the forces involved without putting the automatic adjustment into operation, the trapping force generated by the control piston, and more precisely by its collar 72, upon the collar 74 of the bush 76 being greater than the force of the spring 88. When the hydraulic pressure is released, during a first stage, the spring 88 expands and brings the annular component 86 to bear against the shoulder situated between the bores 84 and 68, and the nut 60 is then no longer subjected to an axial force transmitted by the ball thrust race but remains without operational play. During a second stage, the seal 24 brings the piston 20 to the right in FIG. 1 in a conventional manner and the operational play now appears between the nut 60 and the ball thrust race. During a third stage, the pressure continuing to fall, the seal 66, in the same way as the seal 24 previously, pushes the control piston 64 to the right thus freeing the collar 74 of the bush 76 which is once again free to turn with the nut 60 if the latter is pushed in rotation.

FIG. 2 shows a variant of the embodiment shown in FIG. 1 in which only the end of the hydraulic control piston 20 is shown. In this variant, a spring 94 formed by an elastic washer is positioned between a shoulder 96 formed on the control piston 64 and a circlip 98 firmly fixed to the piston 20. A second circlip 100 positioned on the end of the control piston 64 limits the relative movement between the piston 20 and the control piston 64 under the effect of the spring 94.

Operation of the brake is identical to that described in the framework of the first embodiment, except that the spring 94 assists the force of the seal 66 so as to ensure movement of the piston 64 to the right when the pressure in the chamber 30 falls. It also enables the predetermined pressure for which the automatic adjustment is prevented to be modified easily.

FIG. 3 shows a second embodiment. The disk brake shown in FIG. 3 incorporates a sliding calliper given as a unit the general reference 110 mounted on a fixed support or component (not shown) capable of being fixed to a fixed portion of the vehicle (not shown). The calliper 110 incorporates a brake actuator given as a unit the general reference 112 capable of acting directly upon a first friction component 114 and indirectly, through the sliding calliper, upon a second friction component 116 so as to push both of the latter into frictional engagement with a rotating disk 118. The brake actuator 112 incorporates a hydraulic control and a mechanical control as will be seen in greater detail.

The hydraulic control is provided by a hydraulic control piston 120 mounted so as to slide in a bore 162 formed in a control piston 164, itself mounted so as to slide in a bore 122 formed in the brake actuator 112. The seal between the piston 120 and the bore 162 is provided by a seal 166 whereas the seal between the control piston 164 and the bore 122 of the body 112 is provided by a seal 124. The pistons 120 and 164 are also protected by a piston cap 126. The pistons 120 and 164 and a bottom wall 128 of the bore 122 define a chamber 130 which is capable of being connected to a source of pressure (not shown) such as, for example, the master cylinder of the vehicle.

The mechanical control, given as a unit the general reference 132, is provided by means of a lever 134 capable of being joined to a cable or similar device (not shown) firmly fixed to a shaft 136 in which a groove 138 is formed which houses a link 140. The shaft 136 is housed in two bores formed in the brake actuator and is immobilized longitudinally relative to the actuator by means of a shoulder formed on the lever 134 on each side by means of a circlip or similar device. The shaft 136 and the link 140 are mounted in a blind bore 142 formed in the brake actuator, the open portion of the bore is provided with a plug and the assembly is protected by a flexible cap 144. The bore 142 also houses a screw 146 of which an enlarged portion 148 incorporates a groove 150 which co-operates with the link 140. A return spring 152 is positioned between the bottom of the blind bore 142 and the enlarged portion 148. The screw 146 incorporates a cylindrical portion in which a groove is formed incorporating a seal 154. This seal 154 and the cylindrical portion of the screw 146 are capable of sliding relative to a bore 156 formed in the body of the brake actuator. The screw 146 extends into the chamber 130 by a threaded portion 158 of reversible pitch on which a nut 160 is mounted. The hydraulic control piston 120 incorporates a bore 168 which is extended by a second bore 184 of greater diameter than the bore 168, the bore 184 being positioned on the same side as the chamber 130. An annular component 186 is held so as to bear against the step formed by the two bores 168 and 184 by means of a ring 190 positioned in a groove formed in the bore 184. A ball thrust race is positioned between the annular component 186 and a collar 182 formed on the nut 160, the annular component 186 and the collar 182 forming rolling tracks. A unidirectional clutch 192 is positioned between the hydraulic control piston 120 and the nut 160, the unidirectional clutch 192 being formed in the embodiment shown by a spring clutch mounted on a cylindrical portion of the nut 160, one end of which enters a hole formed in the control piston 120. The nut 160 extends in the direction of the chamber 130 by an extension 202 which passes through the annular component 186. This extension incorporates, at its end on the same side as the chamber 130, end fingers 180 which engage fingers 178 formed on an annular component 176. The fingers 178 and 180 are capable of sliding axially relative to one another but firmly fix the nut 160 and the annular component 176 in rotation. The annular component 176 extends radially outwards without reaching the bore 162 of the control piston 164, but in such a way as to be facing the end wall 170 of the piston 120 on the same side as the chamber 130. The control piston 164 has a collar 172 at its end which is on the same side as the chamber 130, the collar 172 extending radially inwards in such a way as to enclose the annular component 176 between this collar 172 and the wall 170 of the piston 120. A degree of axial play is provided between the collar 172 and the annular component 176 avoiding the trapping of the annular component 176. At its end away from the chamber 130, the control piston has a frontal surface 196 positioned facing another frontal surface 198 formed on the hydraulic piston 120, the distance between the frontal surfaces 196 and 198 being greater than the play between the collar 172 and the annular component 176. The piston 120 incorporates a shoulder 204 allowing the mounting of the cap 126 and, more precisely, of an annular portion 194 firmly fixed to the cap 126, this annular component or rim being such that it extends from the shoulder 204 to the frontal surface 196 of the control piston.

In this second embodiment, an elastic ring 200 is mounted in a groove, 106 formed on the hydraulic piston 120 and enters a groove formed in the control piston 164 so as to face the groove 106, thus limiting the relative movement between the hydraulic piston 120 and the control piston 164 and avoiding accidental disengagement of the fingers 178 and 180. It is understood that any other device for limiting movement may be used. This elastic ring 200 allows the hydraulic piston 120 and the control piston 164 to be removed as a unit.

The brake described above with the aid of FIG. 3 operates in the following manner:

At rest, the different components of the brake occupy the positions shown. When the brake is operated by means of the mechanical control, the lever 134 and the shaft 136 push the link 140 in a general direction shown by the arrow F1. The link 140 through the groove 150 pushes the enlarged portion 148 of the screw 146 against the spring 152. As the cylindrical portion of the screw can slide relative to the bore 156 formed in the brake actuator the screw 146 also moves in the direction of the arrow F1. This movement of the screw 146 is transmitted to the nut 160 by means of the threaded portion 158, rotation of the nut 160 being prevented by the unidirectional clutch 192, and the nut 160 comes to bear against the hydraulic piston 120. The force of the link 140 is thus transmitted to the friction component 114 and by reaction of this friction component 114 against the disk 118 an opposite reaction appears against the shaft 136 which drives the calliper 110 in sliding in a direction opposite to that defined by the arrow F1 which brings the friction component 116 in contact with the disk 118. When the manual control is released the different components of the brake recover the positions shown.

When the brake is operated by means of the hydraulic control, a hydraulic pressure is applied to the chamber 130 so as to push the piston 120 to the left referring to FIG. 3. If the movement of the piston 120 relative to the nut 160 does not exceed the operational play defined between the ball thrust race, the annular component 186 and the collar 182, the movement of the piston 120 has no effect on the automatic adjustment. If the movement of the piston 120 is greater than the predetermined play the nut 160 is driven to the left by the piston 120 through the ball thrust race of the annular component 186 which is firmly fixed to the piston. The screw 146 being immobilized axially by means of the spring 152, the nut 160 turns relative to the screw 146 owing to the reversible pitch so as to be able to follow the movement of the piston 120, the unidirectional clutch 192 allowing this rotation. During this phase of operation, the annular component 176 is free to turn with the nut 160, the control piston 164 not applying the annular component 176 to the wall 170, as will be seen below. If the hydraulic pressure is then released, in a conventional manner the seal 166 causes the piston 120 to retract slightly, the unidirectional clutch 192 preventing rotation of the nut 160. As during the application of braking the nut has turned while moving to the left, the automatic adjustment device is thus now in a new position which is offset to the left and prevents the piston from occupying its initial position.

If, however, braking is not released immediately, the pressure in the chamber 130 continues to rise and under the effect of this pressure and of the force generated by the piston 120 the calliper distorts. It is thus necessary to prevent operation of the adjustment before mechanical distortion of the calliper commences.

When the pressure in the chamber 130 reaches the level defined by the cross-sectional area of the control piston 164, by the resistance to movement of this piston generated by the seal 124, and by the force distorting the annular portion 194 of the cap 126, the control piston 164 moves to the left under the effect of this pressure and traps, by means of its collar 172, the annular component 176 against the wall 170 of the piston 120. The annular component 176 then being immobilized in rotation by the control piston 164, any rotation of the nut 160 becomes impossible owing to the fingers 178 and 180. The nut 160, being impossible to turn, drives the screw 146 through the thread with reversible pitch and compresses the spring 152. The piston 120 and the piston 164 move to the left under the effect of the pressure prevailing in the chamber 130 generating distortion in the calliper owing to the forces involved without putting the automatic adjustment into operation, the trapping force generated by the control piston and more precisely by its collar 172 against the annular component 176 being greater than the force of the spring 152. When the hydraulic pressure is released, during a first stage, the spring 152 expands and brings the screw 146 into its initial position, and the nut 160 is then no longer subjected to an axial force transmitted by the screw 146 but remains without operational play. During a second stage, the seal 166 retracts the piston 120 to the right in FIG. 3 in a conventional manner and the operational play now appears between the nut 160 and the ball thrust race. During a third stage, the pressure continuing to fall, the seal 124, in the same way as the seal 166 previously, pushes back the control piston to the right, assisted in this by the annular portion 194 of the protective cap 126 thus freeing the annular component 176 which is once again free to turn with the nut 160 if the latter is pushed in rotation.

As may be seen from the description of this second embodiment, the device which is the subject of the invention allows the prevention of the automatic adjustment to be controlled from a predetermined pressure defined by the cross-sectional area of the control piston 164 and by the stiffness of the annular portion of the protective cap 126. It will be noted that when the predetermined pressure is reached, the control piston 164 bears axially against the piston 120 by means of its collar 172 through the annular component 176, and the force generated by the pressure prevailing in the chamber 130 on the friction components is thus the same as if the piston 120 extended as far as the bore 122 of the body of the brake actuator. This solution allows the device which is the subject of the invention to be installed in an existing brake without changing its characteristics of operation and without any intervention in the machining either of the calliper or of the screw of the automatic adjustment.

The same applies to the first embodiment described above.

It will also be seen that the hydraulic piston, the control piston, the annular component and the nut form an assembly which may be removed as a unit from the brake actuator and from the screw.

It is clear that the invention is not limited to the embodiments described above and that the method of operation of the mechanical control may be replaced by any other control generating an axial force on the screw in the direction of the arrow A shown in FIG. 1, and in the same way the unidirectional clutch 92 may be constructed otherwise than by a spring clutch and that anti-rotation devices of the pistons 20 and 64 may be added without departing from the scope of the present invention.

We claim:

1. A disc brake with automatic adjustment of the type comprising a caliper, a brake actuator carried by the caliper and including an actuator piston having one side exposed to a pressure chamber and movable axially to actuate at least one friction member, a mechanical control acting upon the actuator piston via an automatic adjustment device comprising a screw-and-nut assembly with reversible pitch operable by the actuator piston beyond a predetermined travel of the actuator piston, a annular member movable axially and coupled to the nut for rotation therewith, and a control piston having one end exposed to the pressure chamber and movable axially to cooperate in engagement with the annular member for immobilizing rotationally the annular member when hydraulic pressure in the pressure chamber reaches a predetermined pressure, wherein the actuator piston and the control piston are mounted coaxially one inside the other in direct mutual sealing and sliding engagement.

2. The disc brake according to claim 1, wherein the control piston immobilizes rotationally the annular membr by bringing axially the annular member into non-rotational engagement with a radial surface of the actuator piston when the predetermined pressure is reached.

3. The disc brake according to claim 2, further comprising resilient means disposed between the control piston and actuator piston and biasing axially the control piston away from the radial surface of the actuator piston.

4. The disc brake according to claim 3, wherein the control piston is housed sealingly and slidingly in a bore of the actuator piston.

5. The disc brake according to claim 4, wherein the resilient means is an annular seal disposed between the control piston and bore of the actuator piston.

6. The disc brake according to claim 5, wherein the bore housing the control piston is formed centrally in an end wall of the actuator piston, the end wall adjacent the friction member.

7. The disc brake according to claim 3, wherein the actuator piston is housed sealingly and slidingly in a bore formed in the control piston, the control piston housed sealingly and slidingly in a coaxial bore formed in the brake actuator.

8. The disc brake according to claim 7, wherein the control piston is an annular piston having formed at one end a flange extending radially inwardly and adjacent a first frontal surface forming said radial surface of the actuator piston, the annular member having a radial portion interposed between said flange and first frontal surface.

9. The disc brake according to claim 8, wherein the control piston has formed at the other end a second frontal surface, the resilient means positioned axially between said second frontal surface and an adjacent frontal surface formed on the actuator piston.

10. The disc brake according to claim 9, wherein the resilient means is an annular bead of a protective boot of the brake actuator.

11. The disc brake according to claim 3, wherein the actuator piston, control piston, annular member, and nut form an integrated assembly which is removable as a unit.

12. The disc brake according to claim 2, wherein the control piston has at one end a radial surface extending adjacent said radial surface of the actuator piston, the annular member having one radial portion interposed axially between said radial surfaces of the pistons.

* * * * *